United States Patent
Ali et al.

(10) Patent No.: US 10,237,476 B2
(45) Date of Patent: Mar. 19, 2019

(54) DISPLAY SYSTEM FOR A MACHINE

(71) Applicant: Caterpillar Inc., Peoria, IL (US)

(72) Inventors: Hassan Ali, Peoria, IL (US); Zarnaben Patel, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 93 days.

(21) Appl. No.: 15/429,208

(22) Filed: Feb. 10, 2017

(65) Prior Publication Data

US 2018/0234626 A1    Aug. 16, 2018

(51) Int. Cl.
*H04N 5/232*    (2006.01)
*H04N 7/18*    (2006.01)
*G06T 11/60*    (2006.01)
*E02F 3/30*    (2006.01)
*E02F 9/16*    (2006.01)
*E02F 9/26*    (2006.01)
*E02F 3/96*    (2006.01)

(52) U.S. Cl.
CPC ......... *H04N 5/23238* (2013.01); *E02F 3/307* (2013.01); *E02F 9/166* (2013.01); *E02F 9/261* (2013.01); *G06T 11/60* (2013.01); *H04N 5/23293* (2013.01); *H04N 7/181* (2013.01); *E02F 3/964* (2013.01)

(58) Field of Classification Search
CPC .......... H04N 5/23238; H04N 5/23293; H04N 7/181; G06T 11/60
USPC ........................................................... 348/38
See application file for complete search history.

(56) References Cited

U.S. PATENT DOCUMENTS

| 9,084,004 B2 | 7/2015 | Peter et al. |
| 9,217,240 B2 * | 12/2015 | Shibata .................. E02F 3/964 |
| 2016/0297362 A1 | 10/2016 | Louis et al. |

FOREIGN PATENT DOCUMENTS

| CN | 103587485 | 2/2014 |
| JP | 2009243073 | 2/2014 |

* cited by examiner

*Primary Examiner* — Nam D Pham
(74) *Attorney, Agent, or Firm* — Harrity & Harrity LLP

(57) ABSTRACT

A display system for a machine includes multiple imaging devices configured to capture image data of an environment around the machine. The display system includes a position sensor configured to generate signals indicative of position of an operator seat. The display system further includes a display screen in communication with the imaging device and the position sensor. The display screen receives the image data from the multiple imaging devices. The display screen displays an image on the display screen based on the image data. The display screen receives the signals indicative of the position of the operator seat. Further, the display screen adjusts the image being displayed on the display screen based on the position of the operator seat.

20 Claims, 7 Drawing Sheets

DISPLAY SYSTEM FOR A MACHINE

TECHNICAL FIELD

The present disclosure relates to a display system for a machine. More specifically, the present disclosure relates to control of the display system for the machine.

BACKGROUND

A conventional backhoe loader is typically provided with a loader for conveying earth etc. anterior to a vehicle body and a backhoe for excavating earth etc. posterior to the vehicle body. The backhoe loader is capable of traveling by driving tires when working with the loader. In such a backhoe loader, an operator seat is disposed in the operator cab provided in a central part of the vehicle body, and the operator seat can be revolved relative to the operator cab. When a work with the loader is performed, the orientation of the seat is set anteriorly to the vehicle body; and when a work with the backhoe is performed, the orientation of the seat is set posteriorly to the vehicle body. Accordingly, the operator can perform various operations through the backhoe loader.

A display screen may be provided with the operator seat so that the operator may view the surroundings efficiently as the loader or the backhoe may hinder a line of sight of the operator while performing an operation. Further, the operator may also view environment around the machine as some of the operations may require the operator to have a view of area sideways of the machine. The display screen may also provide a surround-view image of the environment around the machine. The display screen, however, does not provide appropriate adjustment to an image being displayed on the display screen with the change in orientation of the operator seat. The operator a not have a correct perspective of the image being displayed on the display screen which may make it difficult for the operator to operate the machine as required For example, U.S. Pat. No. 9,217,240 (hereinafter the '240 reference) describes a work vehicle including a first work machine and a second work machine. The work vehicle includes a seat for which an orientation position toward the first work machine and an orientation position toward the second work machine can be switched. The work vehicle includes a seat position detection unit configured to detect the orientation position of the seat. The work vehicle includes a display unit configured to display information related to an operation state of the work vehicle. Further, the work vehicle includes a control unit configured to change information displayed by the display unit according to the orientation position of the seat detected by the seat position detection unit. However, the '240 reference provides operational information in only two orientations. Further, the '240 reference does not discloses anything about displaying images of the environment around the machine. Thus, an improved display system is required.

SUMMARY

In an aspect of the present disclosure, a display system for a machine is provided. The display system includes multiple imaging devices configured to capture image data of an environment around the machine. The display system includes a position sensor configured to generate signals indicative of position of an operator seat. The display system further includes a display screen communicably coupled with the imaging device and the position sensor. The display screen receives the image data from the multiple imaging devices. The display screen displays an image on the display screen based on the image data. The display screen receives the signals indicative of the position of the operator seat. Further, the display screen adjusts the image being displayed on the display screen based on the position of the operator seat.

In another aspect of the present disclosure, a control system for a display system of a machine is provided. The control system includes multiple imaging devices configured to capture image data of an environment around the machine. The control system includes a position sensor configured to generate signals indicative of position of an operator seat. The control system includes a display screen. The control system further includes a controller communicably coupled with the multiple imaging devices, the position sensor, and the display screen. The controller receives the image data from the multiple imaging devices. The controller displays an image on the display screen based on the image data. The controller receives the signals indicative of position of the operator seat. The controller then adjusts the image being displayed on the display screen based on the position of the operator seat.

In yet another aspect of the present disclosure, a method for controlling a display system of a machine is provided. The method includes receiving image data from multiple imaging devices through a controller. The method includes displaying an image on a display screen based on the image data through the controller. The method includes receiving signals indicative of position of an operator seat through the controller. The method further includes adjusting the image being displayed on the display screen based on the position of the operator seat through the controller.

DETAILED DESCRIPTION

Figure 1:
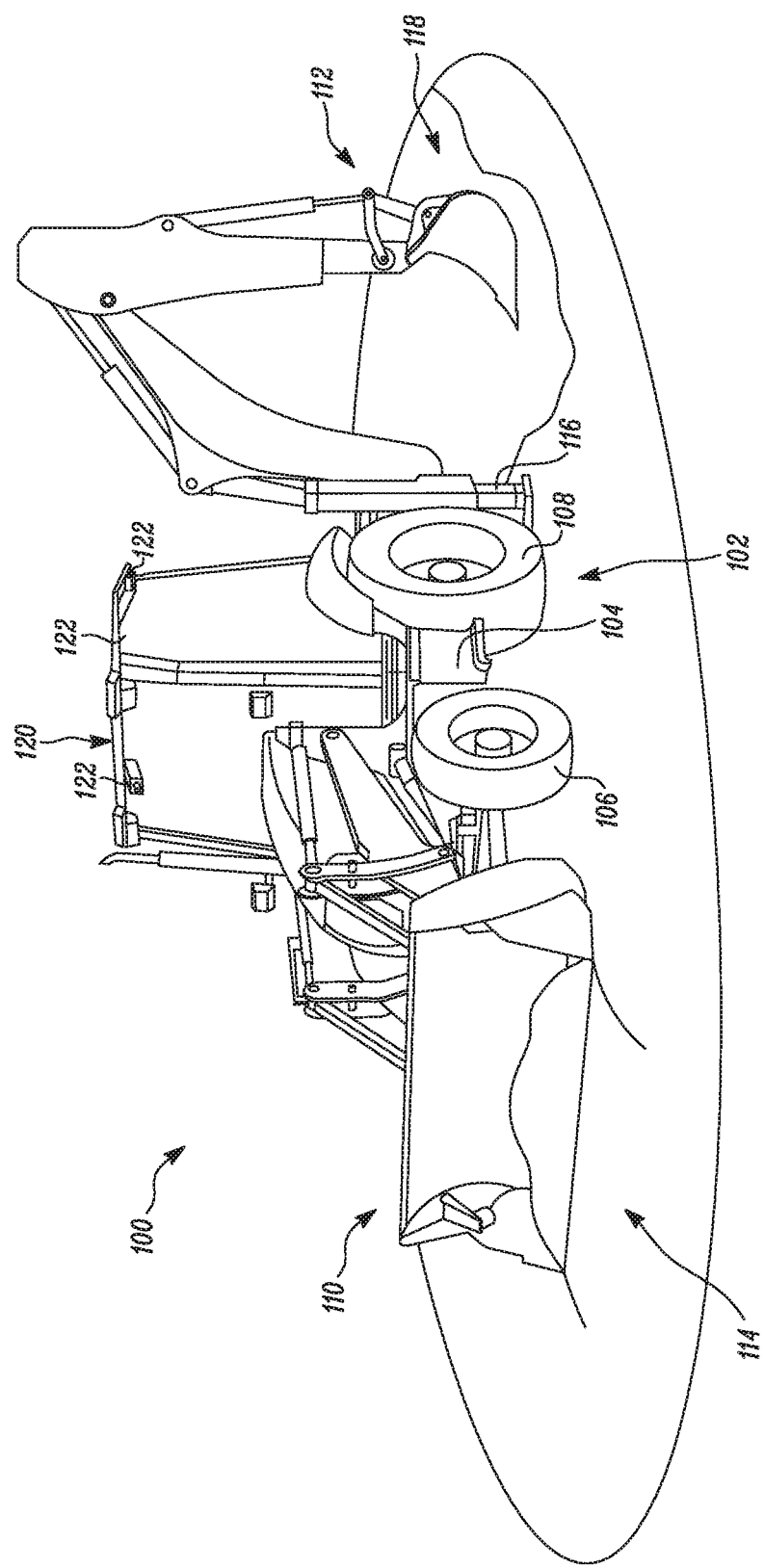
FIG. 1 is a perspective view of a machine, according to an aspect of the present disclosure.

Wherever possible, the same reference numbers will be used throughout the drawings to refer to same or like parts. FIG. 1 shows an exemplary machine 100 illustrated as a backhoe loader which may be employed in connection with embodiments of the disclosure. The machine 100 may also be any other type of machine such as an excavator, a dozer, a track type tractor etc. The machine 100 may include a tractor 102 having a chassis 104. The tractor 102 may include a pair of front wheels 106 and a pair of rear wheels 108. It should be understood that, instead of the front and rear wheels 106, 108, the tractor 102 may include a pair of tracks or any other such ground engaging means to facilitate transportation of the tractor 102 on a ground surface.

The machine 100 may include a first implement 110 and a second implement 112. The first implement 110 may be provided in the form of a loader bucket at a first end 114 of the tractor 102, and suitable operating linkages may be provided for manipulation of the loader bucket. The first implement 110 may be used to move earth or soil as per application requirements. The machine 100 may include a pair of outriggers 116 (e.g., stabilizer legs), mounted adjacent a second end 118 of the tractor 102. The outriggers 116 may be hydraulically or pneumatically controlled in any conventional manner to swing between a stored position, and an extended position in which they contact the ground surface.

The machine 100 may include the second implement 112 in the form of an excavating assemblage, for example, a backhoe mechanism, at the second end 118 of the tractor 102. The excavating assemblage may include a suitable swing assembly for permitting the backhoe mechanism to swing about a pivot from one side of the tractor 102 to the other. The swing assembly may move under the control of one or more hydraulic cylinders, such as hydraulic cylinder, and may serve to move the excavating assemblage from an excavating position to a dumping position.

The machine 100 further includes an operator cab 120 to accommodate an operator to control the machine 100. The operator cab 120 may include various systems for controlling operation of the machine 100. The operator cab 120 includes multiple imaging devices 122 coupled to the operator cab 120 to capture image data of an environment around the machine 100. The imaging device 122 may be a camera or any other such imaging device which may generate image data corresponding to the environment of the machine 100.

The imaging device 122 may be coupled to the operator cab 120 at any location on the operator cab 120 outside of the operator cab 120. Any number of the imaging devices 122 may be coupled to the operator cab 120 based on application requirements. In the illustrated embodiment, there are four imaging devices 122 coupled to the operator cab 120 on front, back, and two sides (only one side is visible) of the operator can 120. The imaging devices 122 may collect image data corresponding to the environment of the machine 100 and may generate signals corresponding to the image data.

Figure 2:
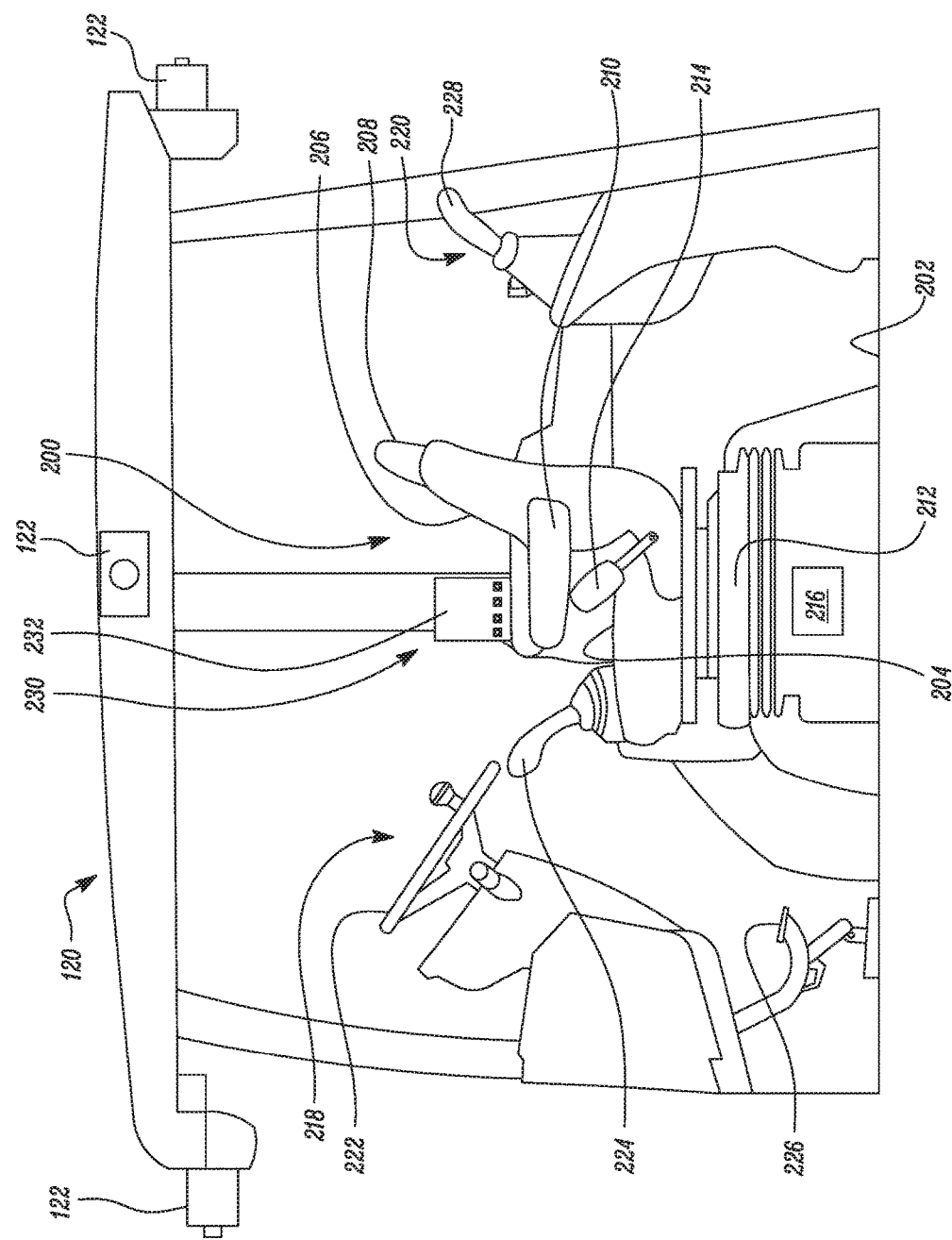
FIG. 2 is a side view of interior of an operator cab of the machine with an operator seat in a first position, according to an aspect of the present disclosure.
Figure 3:
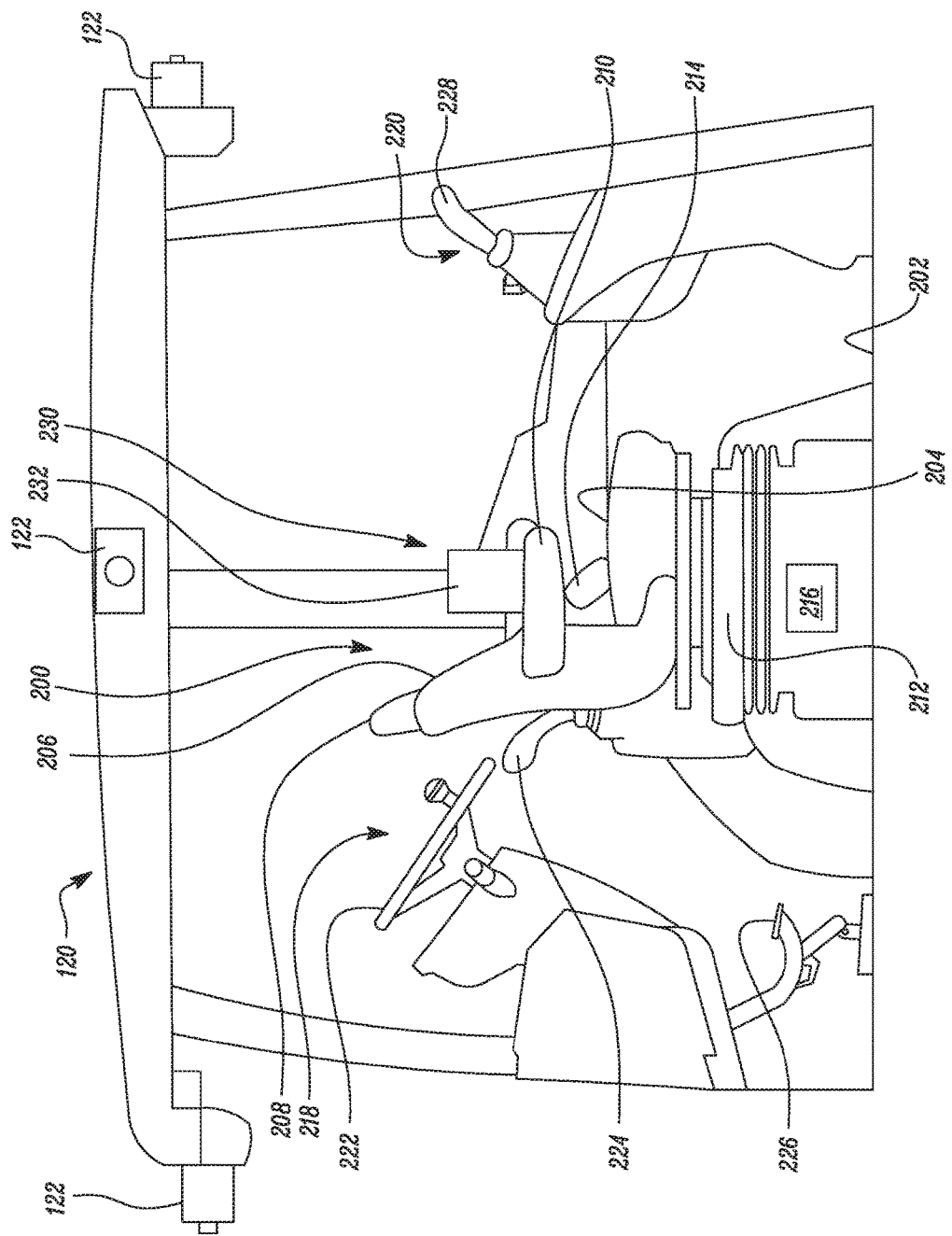
FIG. 3 is a side view of interior of the operator cab of the machine with the operator seat in a second position, according to an aspect of the present disclosure.

FIGS. 2 and 3 illustrate side views of interior of the operator cab 120. With combined reference to FIGS. 2 and 3, the operator cab 120 is provided with an operator seat 200 on a central part on a floor 202. The operator seat 200 includes a seat surface 204, a backrest 206 provided above the seat surface 204, a headrest 208 provided above the backrest 206, and armrests 210 provided at both side parts of the backrest 206. A revolving part 212 is provided under the operator seat 200, and the operator seat 200 is configured to revolve around a revolving shaft (not shown) of the operator seat 200. In one embodiment, the operator seat 200 may rotate 360 degrees about the revolving shaft. The operator seat 200 may rotate by any possible range of angular displacements as per application requirements. In another embodiment, the operator seat 200 may slide to a different position instead of revolving. It should be contemplated that the operator seat 200 may change position in any other manner as well as per application requirements.

The operator may change a position of the operator seat 200 as per application requirements. The operator seat 200 includes a lever 214 to change the position of the operator seat 200. It should be contemplated that the operator seat 200 may also include any other such device such as a control button, joystick etc. to perform a similar function. The operator seat 200 may have a first position in which the operator seat 200 is oriented towards the first implement 110 anterior to the tractor 102 (in a left direction), and a second position in which the operator seat 200 is oriented towards the second implement 112 posterior to the tractor 102 (in a right direction). Further, the operator seat 200 may rotate between the first position and the second position and may be positioned in various intermediate positions as well as per angular rotation of the operator seat 200 about the revolving shaft.

Specifically, FIG. 2 illustrates the first position in which the operator seat 200 is oriented towards the first implement 110 and FIG. 3 illustrates the second position in which the operator seat 200 is oriented towards the second implement 112. The operator seat 200 further includes a position sensor 216 which generates signals indicative of the position of the operator seat 200 relative to the operator cab 120. The position sensor 216 may be any type of a conventional position sensor which may provide information about rotational orientation of the operator seat 200 relative to the operator cab 120.

The position sensor 216 may provide the position information through various output modes such as an angular displacement relative to a reference point or in any other such manner which may be applicable to the scope of the present disclosure. Although, the position sensor 216 is illustrated as to be attached to the revolving part 212 of the operator seat 200, it should be contemplated that the position sensor 216 may be attached to any suitable position on the operator seat 200 as per application requirements.

The operator cab 120 includes a first set of controls 218 to control the first implement 110 and a second set of controls 220 to control the second implement 112. The first set of controls 218 includes a steering wheel 222, a gear change lever 224, an accelerator pedal 226 etc. The first set of controls 218 may include various other components as well as per application requirements. The second set of controls 220 includes a joystick 228 which may be used to control the second implement 112. The second set of controls 220 may include various other components as well as per application requirements.

The operator faces the first set of controls 218 when the operator seat 200 is in the first position, and the operator faces the second set of controls 220 when the operator seat 200 is in the second position. The operator cab 120 may also include various other control systems and components which may be placed on sides of the operator seat 200. The operator may face such controls when the operator seat 200 may be in one of the intermediate positions between the first position and the second position.

The operator cab 120 includes a display system 230 for the operator. The display system 230 includes a display screen 232 which displays images of the environment of the machine 100. The display screen 232 may be any conventional type of a display screen which may suit the application requirements. The operator may control the machine 100 based on the images displayed on the display screen 232. In the illustrated embodiment, the display screen 232 is coupled to the armrest 210 of the operator seat 200.

The display screen 232 may revolve along with the operator seat 200 such that the operator always has a good view of the environment of the machine 100 through the display screen 232. The display system 230 further includes the multiple imaging devices 122 and the position sensor 216. The display screen 232 may be in communication with the imaging devices 122 and may receive the signals indicative of the image data generated by the imaging devices 122. The display screen 232 may process the image data and display various views of the environment around the machine 100.

The display screen 232 may also be in communication with the position sensor 216. The display screen 232 may receive the signals indicative of the position of the operator seat 200 generated by the position sensor 216. The display screen 232 may determine the position of the operator seat 200 relative to the operator cab 120. Further, the display screen 232 may adjust the image being displayed on the display screen 232 based on the position of the operator seat 200 so that the operator may have an appropriate view of the environment around the machine 100.

In one embodiment, the display screen 232 displays a surround-view image of the environment of the machine 100 based on the image data. The display screen 232 may generate the surround-view image by stitching images captured from the multiple imaging devices 122. The display screen 232 may adjust the surround-view image of the environment of the machine 100 being displayed on the display screen 232 based on the position of the operator seat 200 such that the operator may have a correct perspective of the surround-view image.

Figure 4:
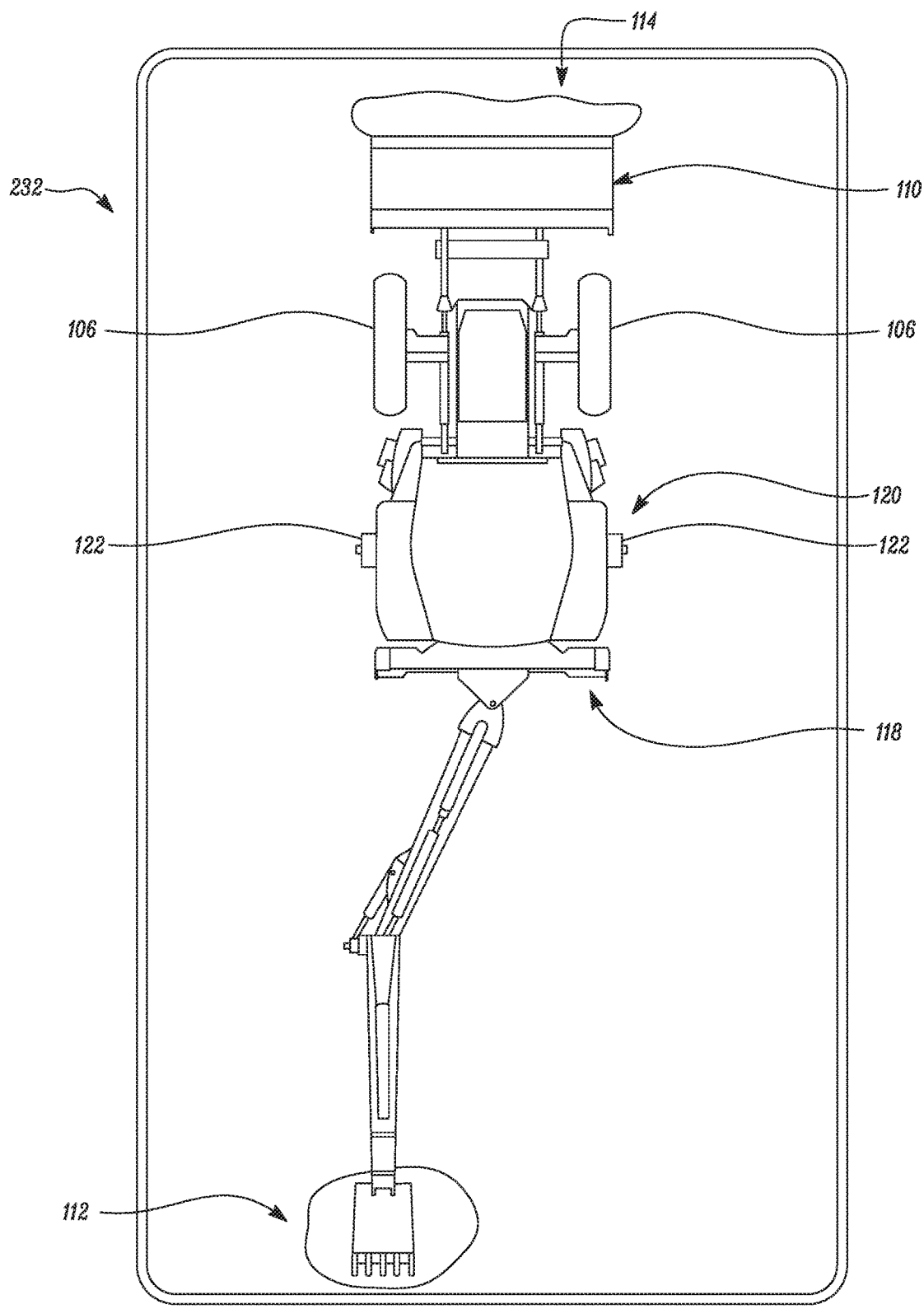
FIG. 4 is an image being displayed on a display screen in the first position of the operator seat, according to an aspect of the present disclosure.
Figure 5:
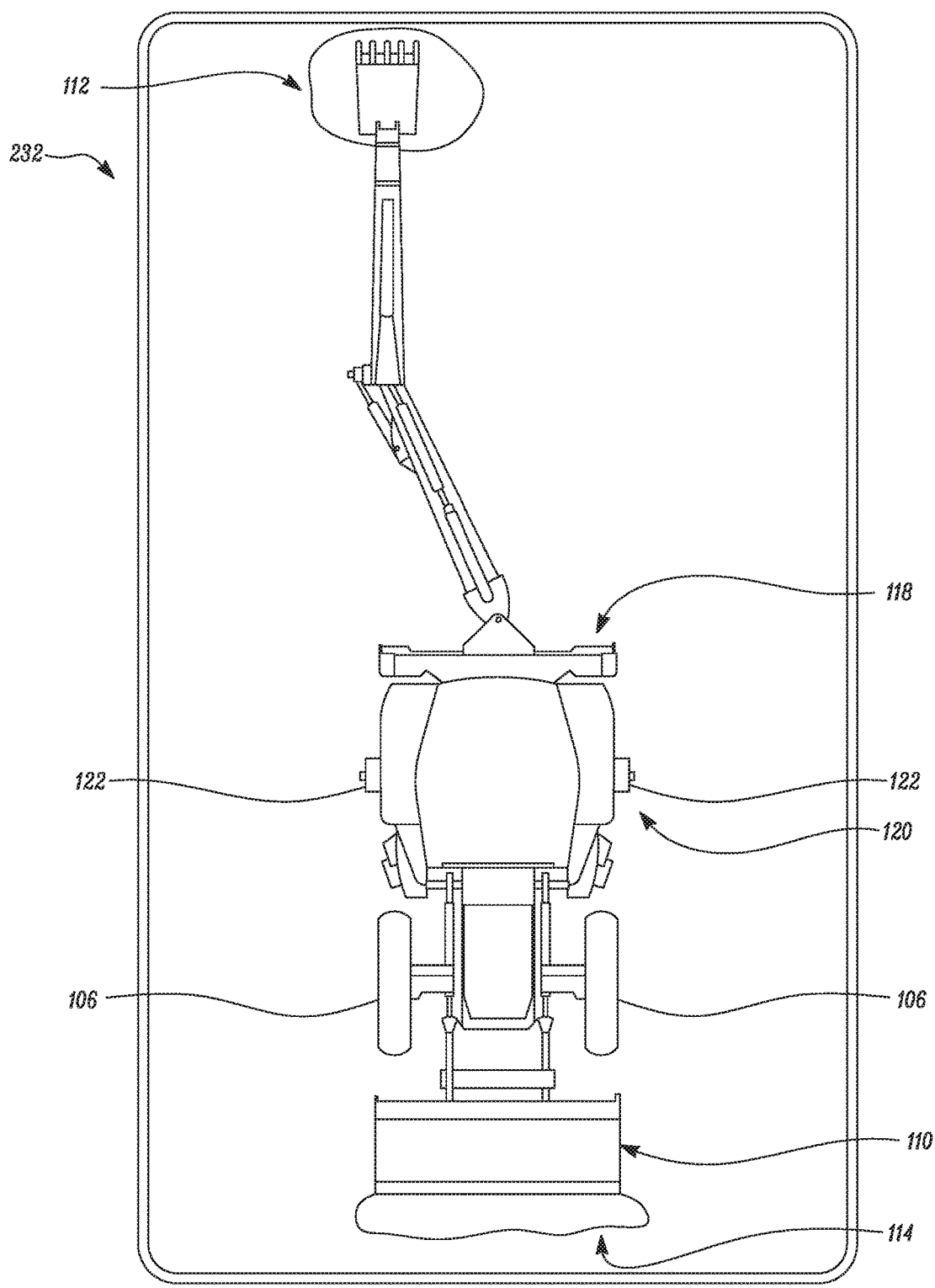
FIG. 5 is an image being displayed on the display screen in the second position of the operator seat, according to an aspect of the present disclosure.

FIGS. 4 and 5 illustrate the images being displayed on the display screen 232 corresponding to the first position and the second position of the operator seat 200. Referring to FIG. 4, the first position of the operator seat 200 corresponds to the operator facing towards the first set of controls 218. In the first position of the operator seat 200, the operator would be operating the first implement 110. Thus, the operator may need to see the view of the environment around the machine 100 on the display screen 232 as if the operator seat 200 is facing towards the first implement 110. The operator may want to see on the display screen 232 a field of view including the first implement 110. In the illustrated embodiment, the display screen 232 displays an image showing the first implement 110 in front of the machine 100.

Similarly, referring to FIG. 5, the second position of the operator seat 200 corresponds to the operator facing towards the second implement 112. In the second position of the operator seat 200, the operator would be operating the second implement 112. Thus, the operator may need to see the view of the environment around the machine 100 on the display screen 232 as if the operator is facing towards the second implement 112. The operator may want to see on the display screen 232 a field of view including the second implement 112. In the illustrated embodiment, the display screen 232 displays an image showing the second implement 112 in front of the machine 100.

With respect to FIGS. 4 and 5, the images displayed on the display screen 232 are exemplary in nature. The display screen 232 may display any other perspective view or any other type of an image as well which may suit the application requirements. Further, it may also be understood that the display screen 232 is illustrated for only the first position and the second position of the operator seat 200. The images being displayed on the display screen 232 may change accordingly as the position of the operator seat 200 changes. For example, if the second implement 112 digs up soil and deposits the soil sideways on a haulage vehicle (not shown), the display screen 232 may show the appropriate view including the second implement 112 and the haulage vehicle.

Figure 6:
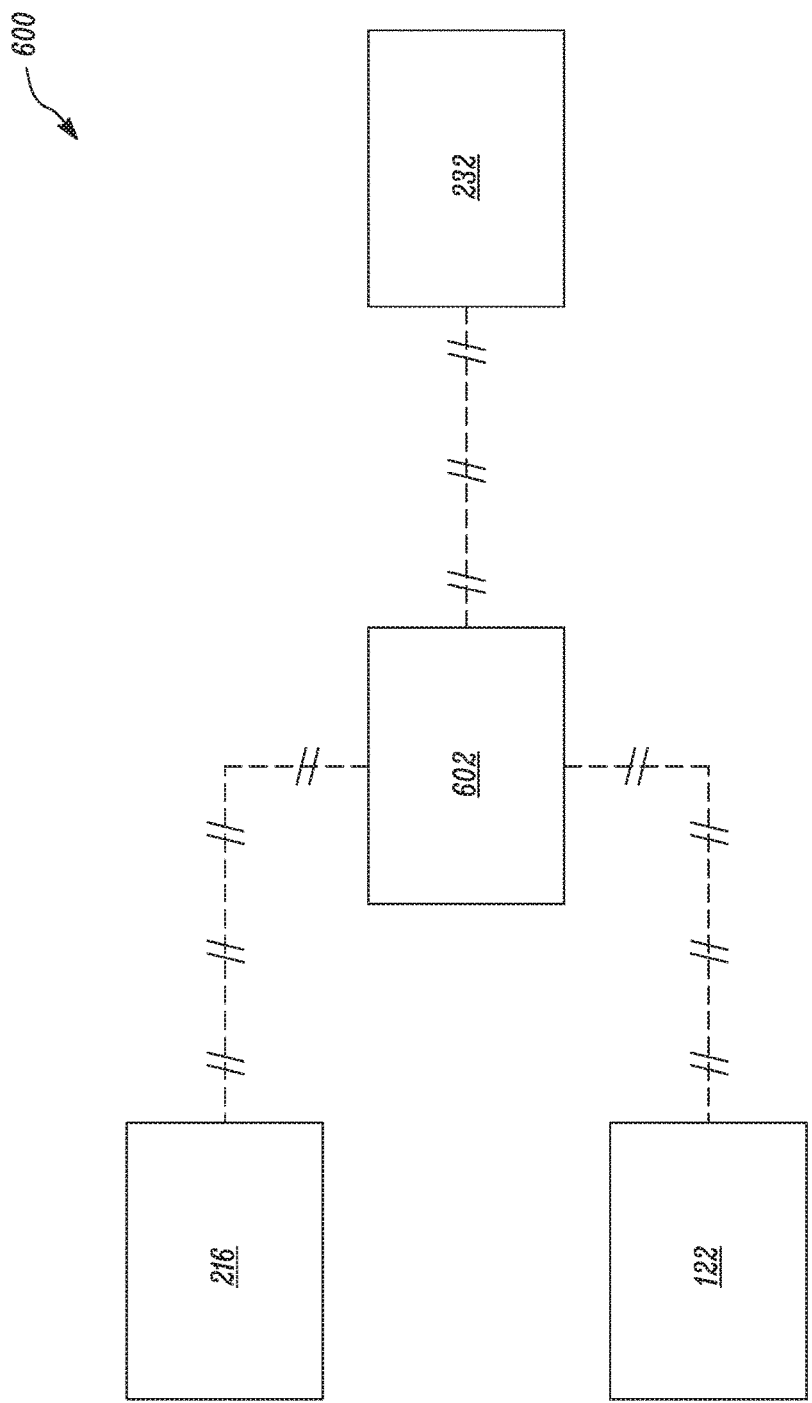
FIG. 6 is a schematic representation of a control system for controlling a display system of the machine, according to an aspect of the present disclosure.

FIG. 6 schematically shows a control system 600 for the display system 230 for the machine 100. The control system 600 includes the imaging devices 122. Any number of the imaging devices 122 may be used as per application requirements. In one embodiment, the control system 600 includes four imaging devices 122 coupled to outside of the operator cab 120. The control system 600 includes the position sensor 216 which generates signals indicative of the position of the operator seat 200. The operator seat 200 may rotate by 360 degrees about the revolving shaft.

The control system 600 further includes the display screen 232 and a controller 602. The controller 602 may be a single controller or a group of multiple controllers configured to control various components of the machine 100. The controller 602 may be an integral part of a machine control system controlling various functions and components of the machine 100. The controller 602 may also be a separate controller which is connected to the machine control system. The controller 602 may have an associated memory to store various operational parameters related to the machine 100.

The controller 602 is communicably coupled to the imaging devices 122, the position sensor 216, and the display screen 232. The controller 602 receives the image data of the environment around the machine 100 generated by the multiple imaging devices 122. The controller 602 may include means to process the image data and display an image of the environment on the display screen 232 based on the image data. In one embodiment, the controller 602 may include means to generate the surround-view image of the environment around the machine 100 based on the image data generated by the imaging devices 122. The controller 602 may generate the surround-view image by stitching together the images received from the multiple imaging devices 122.

The controller 602 may receive the signals indicative of the position of the operator seat 200 from the position sensor 216. The controller 602 may determine the position of the operator seat 200 relative to the operator cab 120. Based on the position of the operator seat 200, the controller 602 may adjust the image being displayed on the display screen 232. In the embodiment where the display screen 232 displays the surround-view image, the controller 602 may adjust the surround-view image. The controller 602 may adjust the surround-view image being displayed such that the operator may see correct perspective of the surround-view image of the environment of the machine 100 as per application requirements.

INDUSTRIAL APPLICABILITY

Figure 7:
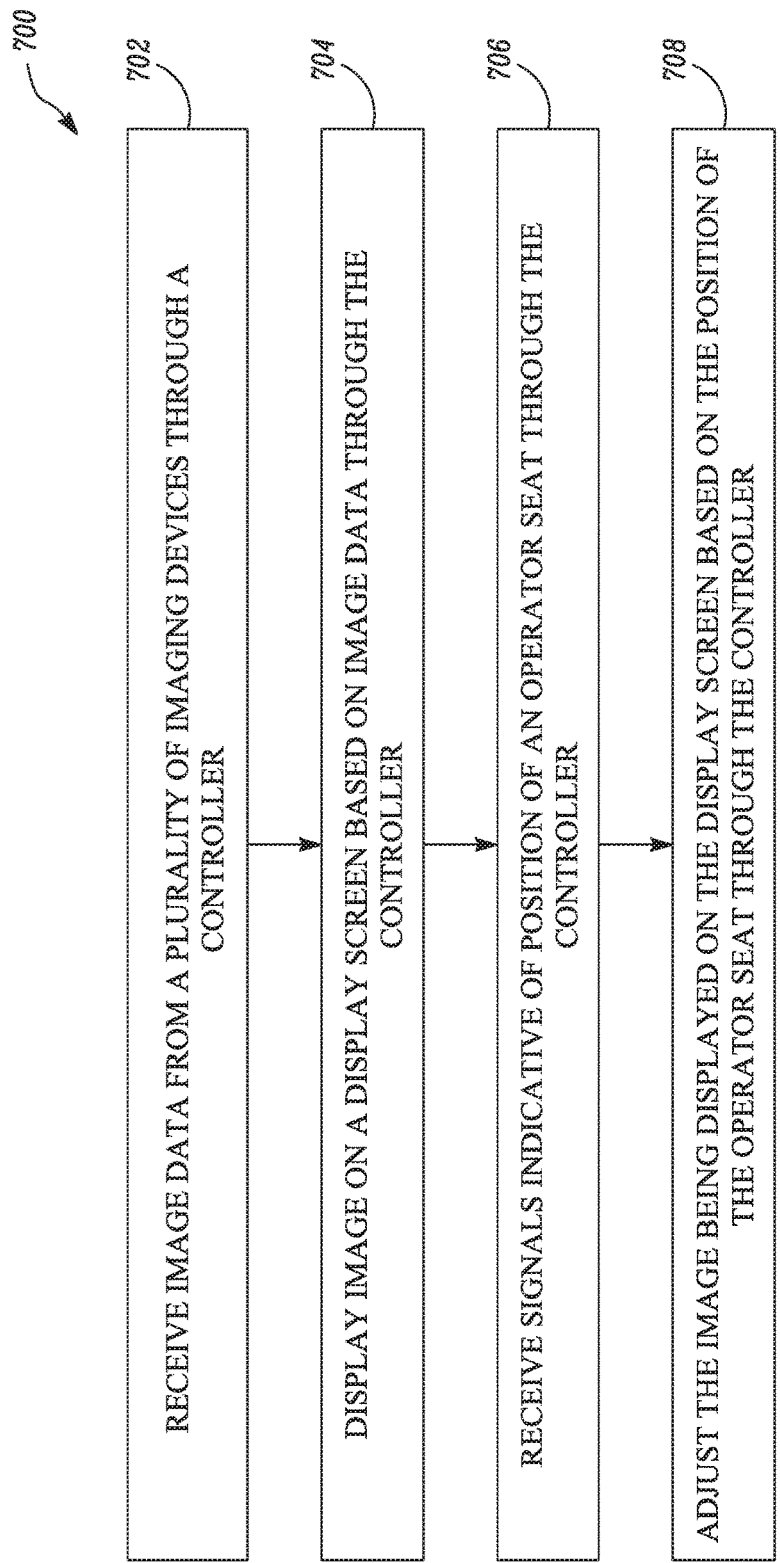
FIG. 7 is a flow chart of a method for controlling the display system of the machine, according to an aspect of the present disclosure.

The present disclosure provides an improved method 700 to control the display system 230 of the machine 100. The method 700 is illustrated through a flow chart shown in FIG. 7. The method 700 at block 702 receives the image data of the environment of the machine 100 through the controller 602. The image data may be generated by the imaging devices 122. Any number of the imaging devices 122 may be used to generate the image data. In one embodiment, four imaging devices 122 are coupled to the outside of the operator cab 120.

The method 700 at block 704 displays the image corresponding to the environment of the machine 100 on the display screen 232 based on the image data through the controller 602. The controller 602 may also include means to generate the surround-view image of the environment of the machine 100. The controller 602 may generate the surround-view image by stitching together the images received from the multiple imaging devices 122. The controller 602 may also display the surround-view image on the display screen 232.

The method 700 at block 706 receives the signals indicative of the position of the operator seat 200 and determines the position of the operator seat 200 relative to the operator cab 120. The signals indicative of the position of the operator seat 200 may be generated by the position sensor 216. The controller 602 may ascertain the orientation of the operator seat 200 by the signals generated by the position sensor 216. In one embodiment, the operator seat 200 is rotatable by 360 degrees about the revolving shaft. However, the operator seat 200 may rotate by any other suitable angle as well as per application requirements.

The method 700 at block 708 adjusts the image being displayed on the display screen 232 based on the position of the operator seat 200. The controller 602 adjusts the image being displayed so as to make sure the operator may see the relevant images to control the machine 100 as per application requirements. In the embodiment, when the surround-view image is being displayed on the display screen 232, the controller 602 may adjust the surround-view image so that the operator may have the correct perspective of the surround-view image.

The present disclosure through the display system 230 and the method 700 facilitates easy and efficient operation of the machine 100. As the operator may switch between operating the first implement 110 and the second implement 112, the display screen 232 seamlessly adjusts the images being displayed and the operator has the relevant view of the environment around the machine 100 at all times on the display screen 232. This makes it easier for the operator to control the machine 100 as the operator has, at all times, the relevant view of the environment around the machine 100 while controlling the machine 100. Also, as the present disclosure also provides the correct perspective of the surround-view image of the environment around the machine 100 for all positions of the operator seat 200, the operator may also perform operations towards sides of the machine 100 apart from the anterior side and the posterior side.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A display system for a machine comprising:
   a plurality of imaging devices configured to capture image data of an environment around the machine;
   a position sensor configured to generate signals indicative of a position of an operator seat; and
   a display screen communicably coupled with the plurality of imaging devices and the position sensor, the display screen configured to:
   receive the image data from the plurality of imaging devices;
   display an image on the display screen based on the image data;
   receive the signals indicative of the position of the operator seat; and
   adjust the image being displayed on the display screen based on the position of the operator seat.

2. The display system of claim 1, wherein the display screen generates and displays a surround-view image of the environment of the machine based on the image data.

3. The display system of claim 2, wherein the display screen adjusts the surround-view image based on the position of the operator seat.

4. The display system of claim 2, wherein the display screen generates the surround-view image by stitching images captured from the plurality of imaging devices.

5. The display system of claim 1, wherein the display system includes four imaging devices coupled to the machine.

6. The display system of claim 1, wherein the operator seat is rotatable by 360 degrees.

7. The display system of claim 1, wherein the machine includes a first implement towards a first side and a second implement towards a second side of the machine.

8. A control system for a display system of a machine, the control system comprising:
   a plurality of imaging devices configured to capture image data of an environment around the machine;
   a position sensor configured to generate signals indicative of a position of an operator seat;
   a display screen; and
   a controller communicably coupled with the plurality of imaging devices, the position sensor, and the display screen, the controller configured to:
   receive the image data from the plurality of imaging devices;
   display an image on the display screen based on the image data;
   receive the signals indicative of the position of the operator seat; and
   adjust the image being displayed on the display screen based on the position of the operator seat.

9. The control system of claim 8, wherein the controller generates and displays a surround-view image of the environment of the machine on the display screen based on the image data.

10. The control system of claim 9, wherein the controller adjusts the surround-view image based on the position of the operator seat.

11. The control system of claim 9, wherein the controller generates the surround-view image by stitching images from the plurality of imaging devices.

12. The control system of claim 8, wherein the display system includes four imaging devices coupled to the machine.

13. The control system of claim 8, wherein the operator seat is rotatable by 360 degrees.

14. The control system of claim 8, wherein the machine includes a first implement towards a first side and a second implement towards a second side of the machine.

15. A method for controlling a display system of a machine, the method comprising:
   receiving, through a controller, image data from a plurality of imaging devices;
   displaying, through the controller, an image on a display screen based on the image data;
   receiving, through the controller, signals indicative of a position of an operator seat; and
   adjusting, through the controller, the image being displayed on the display screen based on the position of the operator seat.

16. The method of claim 15, wherein the controller generates and displays a surround-view image of the environment of the machine on the display screen based on the image data.

17. The method of claim 16, wherein the controller adjusts the surround-view image based on the position of the operator seat.

18. The method of claim 16, wherein the surround-view image is generated by stitching images from the plurality of imaging devices.

19. The method of claim 15, wherein the operator seat is rotatable by 360 degrees.

20. The method of claim 15, wherein the signals indicative of the position of the operator seat are generated by a position sensor.

* * * * *